Patented Dec. 1, 1931

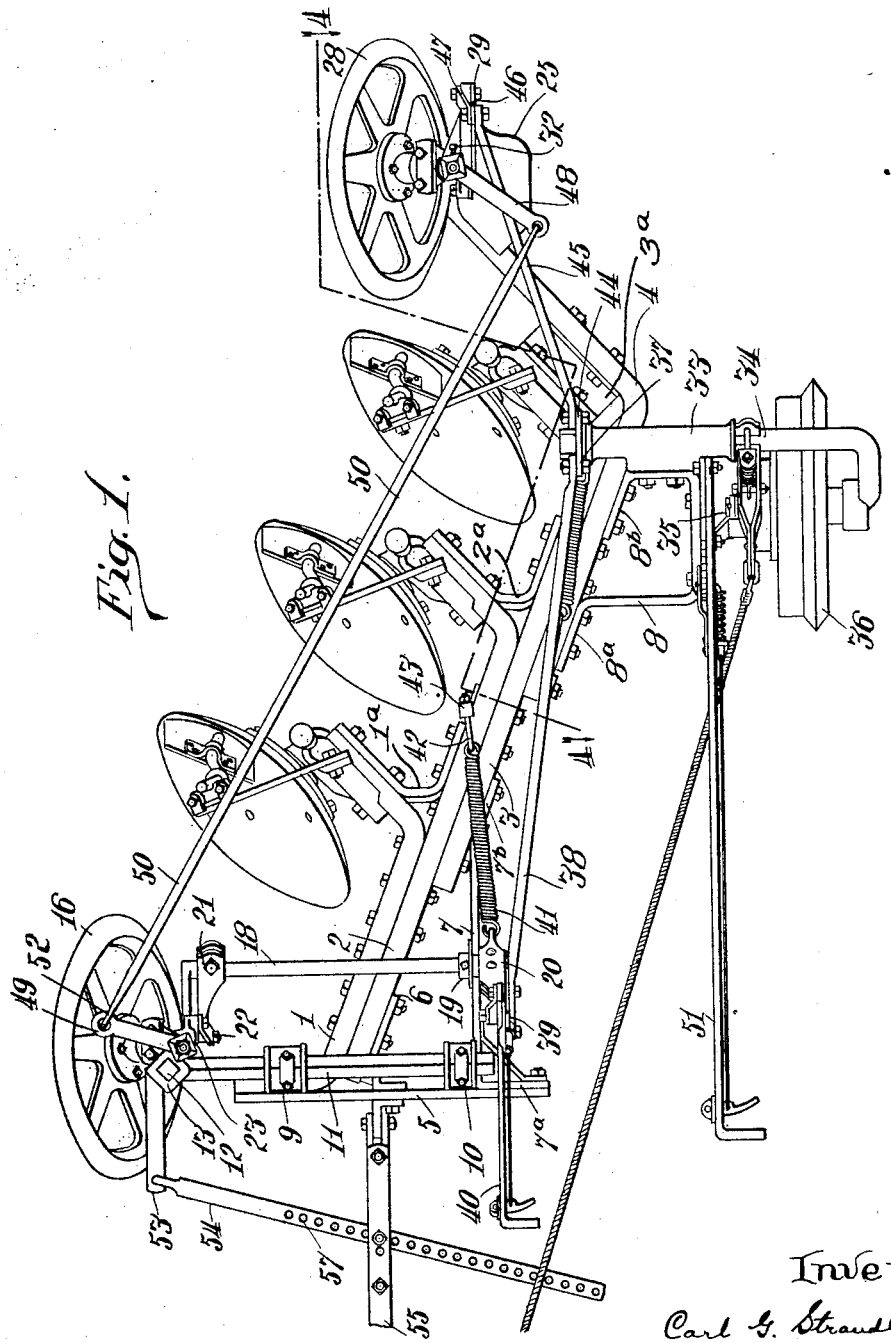

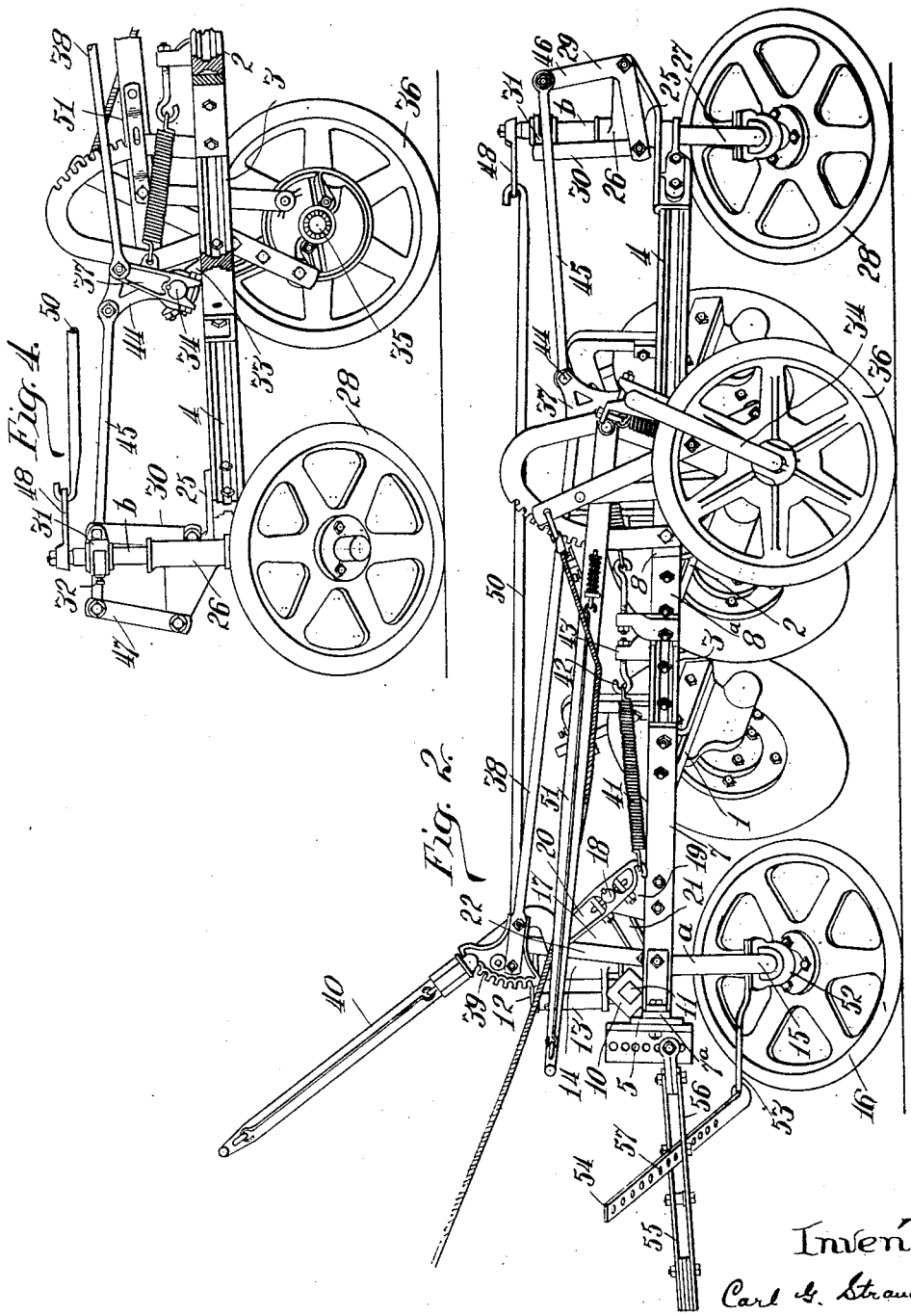

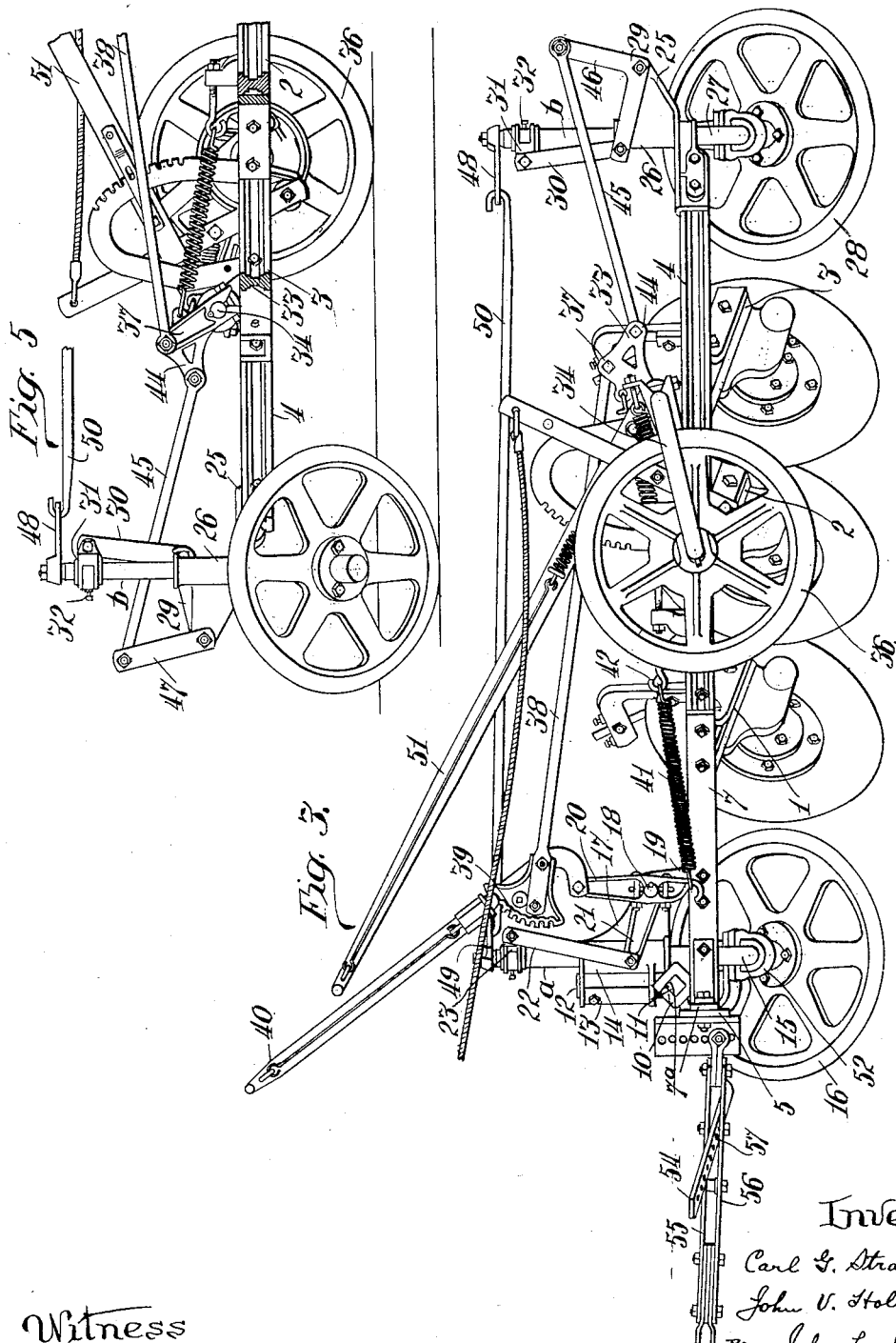

1,834,227

UNITED STATES PATENT OFFICE

CARL G. STRANDLUND AND JOHN V. HOLSTEIN, OF MOLINE, ILLINOIS, ASSIGNORS TO DEERE & COMPANY, OF MOLINE, ILLINOIS, A CORPORATION OF ILLINOIS

DISK GANG PLOW

Original application filed October 1, 1918, Serial No. 256,391. Divided and this application filed March 7, 1927. Serial No. 173,240.

The present invention relates to gang plows and is divisional of our copending application, Serial No. 256,391, filed October 1, 1918. In this prior application we disclosed an improved construction of gang plow comprising a frame or beam structure to which the furrow openers are attached, and which is supported on front and rear furrow wheels and a land wheel in such manner that it may be raised to lift the furrow openers out of operative position by power derived from the traction of the land wheel. The present invention pertains mainly to certain improvements in the frame structure of plows of this general class, and it has for its principal objects to provide an improved frame structure by which the furrow openers will be firmly supported, and the draft power will be properly transmitted thereto, so that they will operate to the best advantage; and to provide an improved attachment of the land wheel frame or bearing to the main beam structure. We accomplish these and other objects as illustrated in the drawings and as hereinafter described. What we regard as new is set forth in the claims.

Referring to the drawings in which similar numerals indicate identical parts:

Figure 1 is a plan view of a disk gang plow embodying our invention.

Figure 2 is a side elevation of Figure 1.

Figure 3 is a side elevation with the plow in operative position.

Figure 4 is a section taken on the line 4—4 of Figure 1 and viewing the land wheel and rear furrow wheel and connections from the furrowward side of the plow, and Figure 5 is a similar view with the parts in a different position.

The frame of the plow comprises beams 1, 2, 3 and 4, rigidly bolted together; the beams 1, 2 and 3 for a portion of their length, are bent rearwardly and furrowward with a downward inclination, and upon them are mounted disk plows of a well known type. As clearly shown in Figure 1, the forward portions of each of these beam bars 1, 2, 3 and 4 overlap and are bolted together, such preferably constituting the entire beam structure. The outwardly bent rear ends of the beam bars 1 and 2 are braced by angle braces 1a and 2a which are rigidly secured to said outwardly bent rear ends and to the body of the beam. The outwardly bent rear ends of the beam bars 3 and 4 are reenforced by a brace in the form of a section of channel 3a, which is bolted to the two bars 3 and 4 between the same. The outwardly and rearwardly bent end of the beam bar 4 carries the rear furrow wheel, as will be presently described. The beam as a whole is disposed diagonally, its forward end being inclined toward the furrowward side of the plow, at which point it is provided with a transverse bar 5 rigidly secured to the forward end portion of the beam 1, which is bent furrowward, as shown in Figure 1, and also to the beam 2, preferably by means of a brace 6. The bar 5 extends landward beyond the said brace, and its landward end portion is firmly secured to the beam structure at a longitudinally intermediate point by a brace 7, the front end of which is secured to the bar 5 at 7a, while the rear end thereof is secured to the beam 3 at 7b. Adjacent to but somewhat in rear of the middle portion of the beam structure is a bracket 8 which projects landward therefrom. As shown in Fig. 1, this bracket is constructed in the form of an open frame having two forwardly extending end portions 8a and 8b which are bolted to the side of the main beam structure. As will be presently described, this bracket constitutes the attachment by which the transverse bearing or auxiliary frame 33 of the land wheel is secured to the main frame beam. It will be evident from the foregoing that the main beam as a whole constitutes a diagonally arranged bar extending fore and aft that is made up of the several beams 1, 2, 3 and 4 and is adapted to support the furrow openers.

Held rigidly in bearings 9 and 10, secured to the beam 1 and the brace 7, is a transversely extending mounting bar 11, preferably rectangular in cross section, having its furrowward end 12 bent upward practically at a right angle, on which I mount a bracket 13. A sleeve 14, preferably integral with the bracket 13, forms a bearing in which is journaled the vertical spindle a of a crank axle 15 on which is mounted the front furrow-wheel 16. In a rearwardly extending support 17, formed preferably integral with the bracket 13, is journaled the furrowward end of a transverse rockshaft 18, the opposite end of which is journaled in a bearing 19 mounted on the main frame by means of the brace 7. The rock shaft 18 extends beyond the bearing 19 to accommodate an arm 20 which is keyed or otherwise secured thereon intermediate its length.

On the rock shaft 18, adjacent the support 17, is rigidly secured a forwardly extending arm 21 having pivotally secured to its extremity a link 22 which is also pivotally connected to a collar 23 on the upper portion of the vertical spindle $a$ of the crank axle 15, the collar 23 being held in place by a bolt 24 which projects through a slot in the collar 23 so as to permit a limited rotary play of the spindle therein.

Securely bolted to the rearward end of the beam 4 is a bracket 25 having a sleeve 26 in which is rotatably mounted a vertical spindle $b$ of a crank axle 27 on which is carried the rear furrow wheel 28. On a rearwardly extending portion of the bracket 25 is pivotally mounted a bell crank 29, to the end of a horizontal portion of which is pivotally connected a link 30 which is also pivotally attached to a collar 31 held on the upper portion of the spindle $b$ by a bolt 32, the latter extending through a slot in the collar 31 to permit a limited rotary movement of the spindle $b$.

A transverse bearing or auxiliary frame 33 is rigidly bolted to the bracket 8, and therein is journaled a crank axle 34 which extends landward from the bearing 33 and is then bent downward at substantially a right angle and terminates in a portion 35 substantially parallel to the part held in the bearing 33. On the portion 35 is mounted the land wheel 36 provided with a clutch mechanism by which the traction power of the land wheel is employed to raise the plow, as fully described and illustrated in letters patent to Carl G. Strandlund, Reissue No. 15,828, dated April 29, 1924. On the furrowward end of the crank axle 34, projecting beyond the bearing 33, is rigidly secured an arm 37 to which is pivotally secured a forwardly extending rod 38 having a segment 39 rigidly mounted on the forward end thereof; a hand lever 40 is pivoted on the rod 38 and is provided with a latch to engage with the segment in the usual manner.

The lever 40 extends below its pivotal connection to the rod 38, from which point it is bent forwardly and pivotally connected to the upper end of the arm 20; a hook is formed on the lower end of the arm 20 to which is connected a relief spring 41, the latter extending to engagement with a hook bolt 42 secured on a bracket 43 on the beam 2. The arm 37 is provided with a rearwardly extending portion 44 to which is pivotally connected a rod 45 which extends rearwardly to pivotal connection with the vertical arm 46 of the bell crank 29. A strap 47 is secured on the opposite side of the rearwardly extending portion of the bracket 25 and parallel to the vertical arm of the bell crank 29, to the upper end of which it is bolted, the purpose of the strap 47 being to reinforce the vertical arm of the bell crank 29 against lateral strain.

A landwardly extending arm 48 is rigidly secured to the upper termination of the spindle $b$, and a similar arm 49 is secured to the spindle $a$ but extending in a furrowward direction, said arms being connected together by a steering rod 50, so that in steering the plow both furrow wheels will be swung simultaneously but in opposite directions.

As shown in Figure 3, the arm 37 is substantially at the limit of its rearward rocking movement when the plow is in operative position, and the point of connection of the rod 45 with the rearwardly extending portion 44 of the arm 37 is then below the plane of the point of connection of the rod 38 with the arm 37. Consequently when the arm 37 is rocked forwardly, in the operation of raising the plow either out of operative position or for the purpose of changing the depth at which it is desired the plow shall work, the effect upon the rear furrow wheel of the rocking movement of the arm 37 is practically nil until the rods 38 and 45 are in substantial alinement, but the effect upon the front furrow wheel of the rocking movement of the arm 37 is practically instantaneous and therefore the forward part of the plow will be raised in advance of the rear part until the rods 38 and 45 are substantially in alinement.

The crank axle 34 is rockable by operation of a lever 51, as more fully detailed in the Strandlund patent above referred to, to swing the land wheel 36 to raise or lower the plow to regulate the depth of plowing. The rear furrow wheel 28 travels in the previously made furrow, and the front furrow wheel 16 coacts with the land wheel in the usual way. On a casting 52, rigidly mounted on the crank portion of the crank axle 15, we secure rigidly a forwardly extending link 53 pivotally connected to a laterally extending bar 54 by means of a hook on the latter engaging with a suitable perforation in the link 53. A draft bar, pivotally connected to the transverse bar 5 of the frame, is composed of an upper member 55 and a lower member 56 spaced apart to permit of the passage therebetween of the bar 54, and adapted to be connected to a tractor in any suitable manner. The bar 54 is provided with a series of perforations 57 by which it is held in place on the draft bar by a bolt or pin extending through any one of the perforations 57 and the members 55 and 56 of the draft bar. By this construction it will be readily seen that when the tractor is turning the draft bar will be swung in the direction of the turn and through the bar 54 and the link 53 the furrow wheels 16 and 28 will respond to guide the plow in the direction taken by the tractor.

The mode of operation of the lift mechanism and of the depth adjustments above referred to has been described at length in our above-mentioned copending application, wherein such subject-matter has been claimed. We shall, therefore, only describe this general operation sufficiently to complete the present disclosure.

The plow frame moves freely vertically on the spindles $a$ and $b$ at all times, whether traveling straight ahead or turning, when the raising mechanism is actuated to raise the plow or is tripped to lower it to an operative position. The plow being down, as shown in Figure 3, when the clutch mechanism is tripped into action by the operator, the axle 34 rocks to swing the land wheel 36 relatively downwardly and rearwardly, and at the same time the arm 37 is rocked forwardly, actuating the bell crank 29, through its connection therewith by the rod 45; as the bell crank 29 rocks, through the link 30 pivotally connected to the forwardly extending arm of the bell crank and to the collar 31 on the spindle $b$, the rear end of the plow is raised, sliding freely on the spindle $b$. The lever 40 is engaged with the segment 39, and as the latter is rigidly connected with the rod 38 which is pivotally connected to the arm 37, these parts move together in raising the plow. The lever 40 is connected at its lower end to the arm 20 on the transverse rock shaft 18, and therefore as the arm 37 is rocked forwardly the arm 20 is also rocked in a forward direction, and by the connection of the link 22 with the upper end of the spindle $a$ the forward end of the plow is raised. By operating the lever 40 the front furrow wheel is independently adjustable to level the plow irrespective of the depth of plowing, and irrespective of the position of the rear furrow wheel and the land wheel.

The plow being raised from the ground as shown in Figure 2, if it be desired to lower it to operative position the parts of the clutch mechanism which hold the plow up, as explained in the Strandlund patent above referred to, are tripped by the operator, whereupon the weight of the plow reverses the action of the parts just described, and the plow descends to the ground. The depth of plowing is regulated by the position of the land and furrow wheels with relation to the frame, and the front furrow wheel 16 and the land wheel 36 are vertically adjustable independently of each other. The land wheel 36 is adjustable by operation of the lever 51 as fully described in said Strandlund patent.

The draft devices 54—55 transmit power to the rod 50 which connects the spindles of the front and rear furrow wheels and therefore the operator can optionally steer the plow by power, and can, at his option, by the clutch control, cause the actuation of all of the lifting devices at the same time to lift the frame with respect to all three wheels. These lifting and lowering movements of the frame and disks can be accomplished either while the plow is moving on straight lines, or simultaneously with its steering movements optionally caused by the operator when he turns the tractor and thereby applies its power to the horizontally swinging wheels.

While the improved construction above described is peculiarly advantageous in connection with gang plows employing furrow openers in the form of disks, it may also be used to advantage with furrow openers of the moldboard type and, therefore, we wish it to be understood that the claims hereinafter made are intended to comprehend gang plows using furrow openers of either type.

What we claim as our invention and desire to secure by Letters Patent, is—

1. In a wheeled plow, the combination of a frame comprising a diagonally disposed beam structure, front and rear furrow wheels and a land wheel supporting said frame, furrow openers connected with said beam structure, a transversely disposed bar at the forward end of said beam structure and fixedly connected therewith, a brace rigidly connected with the landward end portion of said bar and with an intermediate portion of said beam structure, a second transversely disposed bar secured to said first bar and supporting said front furrow wheel at its furrowward end and draft devices connected with said first transverse bar.

2. In a plow of the class described, a diagonally arranged bar extending fore and aft of the plow and adapted to support a plurality of furrow turning elements, and the forward end of which is bent and extends transversely to the path of travel of the plow, wheels for supporting said bar from the ground, a transversely extending draft frame, the furrowward end portions of which is fixedly secured to said bent portion, and through which tractive force may be applied to the plow to draw the same, a brace member, the forward end of which is secured to the landward of said draft frame and the rear end of which brace member is connected with said supporting bar adjacent the middle thereof, and a second brace member secured to the intermediate portion of said draft frame and to said supporting bar.

3. In a wheeled plow, the combination of a frame comprising a diagonally disposed beam structure, front and rear furrow wheels and a land wheel supporting said frame, furrow openers connected with said beam structure, a transversely disposed draft bar at the forward end of said beam structure and fixedly connected therewith, a brace rigidly connected with the landward end portion of said draft bar and extending back and being connected with said beam structure, a transversely extending mounting bar, bracket means securing said mounting bar to said draft bar, the furrowward end of said mounting bar being bent upwardly, and a bracket supported on said upwardly bent end and mounting said front furrow wheel.

4. In a wheeled plow, the combination of a composite diagonally disposed beam structure built up of a plurality of relatively short beams having their forward ends overlapping and rigidly secured together, the rearward ends of the individual beams projecting laterally from the composite beam structure, furrow openers mounted on said laterally projecting rear ends, front and rear furrow wheels and a land wheel supporting said beam structure, a transversely disposed bar at the forward end of said beam structure and fixedly connected therewith, the front end of the forward beam being bent laterally for attachment to said transversely disposed bar, a brace rigidly connected with the landward end portion of said bar and with an intermediate portion of said beam structure, and draft devices connected with said transverse bar.

5. In a plow of the class described, the combination of a composite diagonally disposed beam structure built up of a plurality of relatively short beams having their forward portions overlapping and rigidly secured together, the rear portions of said beams being bent laterally relatively to the beam structure, furrow openers mounted on said laterally projecting rear ends, wheels for supporting said beam structure, a transversely disposed bar at the forward end of said beam structure, laterally spaced bracket means fixedly connecting the bar to said beam structure, and draft devices connected with said transverse bar.

6. In a wheeled plow, the combination of a composite diagonally disposed beam structure built up of a plurality of relatively short beams having forward portions overlapping and rigidly secured together, the rear portions of certain of said beams being bent laterally relatively to the composite beam structure, furrow openers mounted on said laterally projecting rear portions, the rear portion of another of said beams also being bent laterally relatively to the beam structure, a rear furrow wheel mounted on said latter bent portion, a land wheel and a front furrow wheel also supporting said beam structure, and means for establishing a draft connection with said beam structure.

7. In a wheeled plow, the combination of a composite diagonally disposed beam structure built up of a plurality of relatively short beams having forward ends overlapping and rigidly secured together, the rear portions of said beams being bent laterally relatively to the beam structure, a furrow opener mounted on one of said laterally projecting rear portions, a rear furrow wheel mounted on another of said laterally projecting rear portions, a brace member secured between said two laterally projecting rear portions, a front furrow wheel and a land wheel also supporting said beam structure, and means for establishing a draft connection with said beam structure.

8. In a wheeled plow, the combination of a diagonally disposed beam structure, furrow openers carried by said beam structure, front and rear furrow wheels and a land wheel supporting said beam structure, means for establishing a draft connection with said beam structure, a crank axle on which said land wheel is mounted, a frame bearing in which this crank axle is journaled for swinging movement, and a bracket secured between said beam structure and said frame bearing structure, said bracket being constructed in the form of an angular frame having two of its sides secured to one of said structures and another of its sides secured to the other structure.

CARL G. STRANDLUND.
JOHN V. HOLSTEIN.